US009526023B2

United States Patent
Park et al.

(10) Patent No.: US 9,526,023 B2
(45) Date of Patent: *Dec. 20, 2016

(54) SYSTEM AND METHOD FOR ADAPTIVE CONTROL OF AN AVERAGING PARAMETER FOR PCINR AND RSSI

(71) Applicant: Clearwire IP Holdings LLC, Bellevue, WA (US)

(72) Inventors: Sungki Park, Ashburn, VA (US); Masoud Olfat, Great Falls, VA (US); Dhaval Dipak Mehta, Herndon, VA (US)

(73) Assignee: Clearwire IP Holdings LLC, Bellevue, WA (US)

( * ) Notice: Subject to any disclaimer, the term of this patent is extended or adjusted under 35 U.S.C. 154(b) by 317 days.

This patent is subject to a terminal disclaimer.

(21) Appl. No.: 13/959,521

(22) Filed: Aug. 5, 2013

(65) Prior Publication Data

US 2013/0315148 A1    Nov. 28, 2013

Related U.S. Application Data

(63) Continuation of application No. 13/546,590, filed on Jul. 11, 2012, now Pat. No. 8,509,156, which is a
(Continued)

(51) Int. Cl.
| | |
|---|---|
| *H04W 24/10* | (2009.01) |
| *H04L 1/00* | (2006.01) |
| *H04L 1/20* | (2006.01) |

(52) U.S. Cl.
CPC ............ *H04W 24/10* (2013.01); *H04L 1/0019* (2013.01); *H04L 1/20* (2013.01)

(58) Field of Classification Search
CPC .......... H04L 1/0019; H04L 1/20; H04W 24/10
See application file for complete search history.

(56) References Cited

U.S. PATENT DOCUMENTS

| 6,035,183 A | 3/2000 | Todd et al. |
| 6,404,826 B1 | 6/2002 | Schmidl et al. |

(Continued)

FOREIGN PATENT DOCUMENTS

| JP | H07-212299 | 8/1995 |
| JP | 2005-244991 | 9/2005 |

(Continued)

OTHER PUBLICATIONS

Japanese Application No. 2009-275381, Request for Accelerated Examination filed Mar. 15, 2010, with English translation, 5 pages.
(Continued)

*Primary Examiner* — Brian D Nguyen
*Assistant Examiner* — Toan Nguyen (57) ABSTRACT

A system and method for adaptive control of an averaging parameter in a communications network may include an averaging parameter adaptive control module (APAC) that is associated with a base station and that includes one or more processors configured to generate a first averaging parameter that is transmitted by the base station to a mobile station communicating with the base station. The mobile station may use the first averaging parameter to generate first channel condition information that indicates a condition of a communication channel. First feedback information including the first channel condition information may be received at the base station. The APAC may generate a second averaging parameter using the first averaging parameter and the first feedback information and may transmit the second averaging parameter from the base station to the mobile station, thereby adaptively controlling the second averaging parameter based on the first feedback information.

26 Claims, 7 Drawing Sheets

Related U.S. Application Data continuation of application No. 12/434,047, filed on May 1, 2009, now Pat. No. 8,233,434.

(56) References Cited

U.S. PATENT DOCUMENTS

| | | | |
|---|---|---|---|
| 8,089,590 B2 * | 1/2012 | Lu et al. | 349/114 |
| 8,233,434 B2 | 7/2012 | Park et al. | |
| 8,312,337 B2 | 11/2012 | Park et al. | |
| 2002/0012343 A1 | 1/2002 | Holloway et al. | |
| 2003/0036385 A1 | 2/2003 | Uehara et al. | |
| 2004/0259555 A1 | 12/2004 | Rappaport et al. | |
| 2005/0227697 A1 | 10/2005 | Borst et al. | |
| 2006/0057965 A1 | 3/2006 | Braun et al. | |
| 2006/0193373 A1 | 8/2006 | Agee et al. | |
| 2007/0115874 A1 | 5/2007 | Usuda et al. | |
| 2007/0177501 A1 * | 8/2007 | Papasakellariou | H04W 24/00 370/229 |
| 2007/0183380 A1 | 8/2007 | Rensburg et al. | |
| 2007/0189161 A1 * | 8/2007 | Pecen | 370/230 |
| 2007/0211813 A1 | 9/2007 | Talwar et al. | |
| 2007/0232359 A1 | 10/2007 | Pinheiro et al. | |
| 2007/0254597 A1 | 11/2007 | Li et al. | |
| 2008/0014915 A1 | 1/2008 | Usuda et al. | |
| 2008/0025422 A1 | 1/2008 | Bitran et al. | |
| 2008/0056181 A1 * | 3/2008 | Imamura et al. | 370/329 |
| 2008/0059859 A1 | 3/2008 | Marinier et al. | |
| 2008/0132173 A1 | 6/2008 | Sung et al. | |
| 2008/0144626 A1 | 6/2008 | Bertinelli et al. | |
| 2008/0220788 A1 | 9/2008 | Stanwood et al. | |
| 2008/0253342 A1 | 10/2008 | So et al. | |
| 2008/0273610 A1 | 11/2008 | Malladi et al. | |
| 2008/0310338 A1 | 12/2008 | Charpenter et al. | |
| 2008/0310395 A1 | 12/2008 | Kashima | |
| 2008/0317014 A1 | 12/2008 | Veselinovic et al. | |
| 2008/0320354 A1 | 12/2008 | Doppler et al. | |
| 2009/0003257 A1 | 1/2009 | Kumar et al. | |
| 2009/0022254 A1 | 1/2009 | Na et al. | |
| 2009/0034526 A1 | 2/2009 | Ahmadi et al. | |
| 2009/0040993 A1 | 2/2009 | Kim et al. | |
| 2009/0052390 A1 | 2/2009 | Gu et al. | |
| 2009/0059801 A1 | 3/2009 | Garrett et al. | |
| 2009/0059857 A1 | 3/2009 | Kim et al. | |
| 2009/0080374 A1 | 3/2009 | Lee et al. | |
| 2009/0083431 A1 | 3/2009 | Balachandran et al. | |
| 2009/0086657 A1 | 4/2009 | Alpert et al. | |
| 2009/0086704 A1 | 4/2009 | Ho | |
| 2009/0086855 A1 | 4/2009 | Jin et al. | |
| 2009/0092099 A1 | 4/2009 | Gu et al. | |
| 2009/0131066 A1 | 5/2009 | Barve et al. | |
| 2009/0219852 A1 | 9/2009 | Youn et al. | |
| 2009/0300453 A1 | 12/2009 | Sahara | |
| 2009/0310550 A1 | 12/2009 | Medapalli et al. | |
| 2010/0014473 A1 | 1/2010 | Ofuji et al. | |
| 2010/0067401 A1 * | 3/2010 | Medvedev et al. | 370/253 |
| 2010/0214928 A1 * | 8/2010 | Nogami et al. | 370/241 |
| 2010/0278103 A1 | 11/2010 | Park et al. | |
| 2010/0278160 A1 | 11/2010 | Park et al. | |
| 2010/0281322 A1 | 11/2010 | Park et al. | |
| 2011/0276852 A1 | 11/2011 | Mueller-Weinfurtner et al. | |
| 2011/0305213 A1 | 12/2011 | Lohr et al. | |
| 2012/0275388 A1 | 11/2012 | Park et al. | |
| 2013/0070629 A1 | 3/2013 | Park et al. | |

FOREIGN PATENT DOCUMENTS

| | | |
|---|---|---|
| JP | 2005-531247 | 10/2005 |
| JP | 2009-021787 | 1/2009 |
| WO | WO 2004/004173 | 1/2004 |
| WO | WO 2008/044529 | 4/2008 |

OTHER PUBLICATIONS

Japanese Application No. 2009-275381, Japanese Office Action mailed May 14, 2010 with English translation, 6 pages.

Japanese Application No. 2009-275381, Office Action mailed Nov. 22, 2010 with English translation, 4 pages.

International Patent Application No. PCT/US2010/032981, International Search Report and Written Opinion mailed Jul. 2, 2010, 13 pages.

International Patent Application No. PCT/US2010/032986, International Search Report and Written Opinion mailed Jul. 2, 2010, 10 pages.

\* cited by examiner

SYSTEM AND METHOD FOR ADAPTIVE CONTROL OF AN AVERAGING PARAMETER FOR PCINR AND RSSI

CROSS-REFERENCE TO RELATED APPLICATIONS

This Application is a continuation of U.S. patent application Ser. No. 13/546,590 filed Jul. 11, 2012, now U.S. Pat. No. 8,509,156, which is a continuation of U.S. patent application Ser. No. 12/434,047 filed May 1, 2009, now U.S. Pat. No. 8,233,434, the entire contents of both of which are hereby incorporated by reference. This Application is related to U.S. patent application Ser. No. 12/434,029 entitled "System and Method for Hybrid Schemes of MIMO Mode Decision" and U.S. patent application Ser. No. 12/434,063, now U.S. Pat. No. 8,312,337, entitled "System and Method for Dynamic Hybrid Automatic Repeat Request (HARD) Enable/Disable," both of which are hereby incorporated by reference in their entireties.

BACKGROUND

This disclosure relates to a system and method for adaptive control of an averaging parameter used to generate channel condition information such as PCINR and RSSI in a Wireless Metropolitan Area Network (WiMAX).

In a WiMAX communications network, a base station (BS) may communicate with a mobile station (MS) on a communication channel. Various factors such as the existence of ambient interference around the MS or BS, movement of the MS, and other factors may degrade or otherwise alter the channel condition of the communication channel. As such, various methods have been developed to indicate the channel condition. For example, a variety of indicators may be used such as, for example, a Physical Carrier to Interference plus Noise Ratio (PCINR), a Received Signal Strength Indicator (RSSI), an ACK/NACK ratio that indicates a proportion of successful data transmissions to unsuccessful transmission (thereby indicating channel stability), PCINR Standard Deviation that may indicate Doppler and fading effects that result from movement of the MS, and other indicators. These indicators may be generated at the MS and transmitted to the BS. The BS may receive the channel condition indicators and attempt to adjust communication in response to changes to the channel condition. For example, the BS may perform download link adaption such as, for example, selecting an appropriate Modulation Coding Scheme (MCS) according to the channel condition in response to various changes to the channel condition. As such, receiving current and accurate channel condition information may enhance the ability of the BS to respond to changes to the channel condition.

When generating the channel condition information, such as, for example, PCINR, the MS may use an averaging parameter transmitted by the BS. Existing systems use a fixed averaging parameter that does not reflect the channel condition, resulting in lower throughput of the communication channel.

These and other drawbacks exist.

SUMMARY

Various embodiments disclosed herein addressing these and other drawbacks relate to a system and method for adaptive control of an averaging parameter for channel condition information such as PCINR and RSSI in a WiMAX network. Adaptive control of the averaging parameter according to channel condition information may facilitate PCINR data, for example, that reflects changes to the channel condition, thereby enabling the BS to respond more effectively to the channel condition.

According to various embodiments, a system and method may be used to adaptively control an averaging parameter generated by the BS and transmitted to the MS coupled to the BS via a communication channel in a communication network. The communication network may be a WiMAX Network described in the IEEE 802.16 specification. The BS may adapt the averaging parameter according to the channel condition of the communication channel. Thus, the averaging parameter may be adapted by the BS as the channel condition changes.

According to various embodiments, the BS may use a linear function of potential averaging parameters and Standard Deviations (SD), for example, in order to adaptively control an averaging parameter. In other words, the BS may select an appropriate averaging parameter according to the channel condition based on a linear function. The linear function may correlate potential averaging parameters with Standard Deviations. For example, a PCINR Standard Deviation, which may indicate Doppler and fading effects, may be reported by the MS to the BS. A high PCINR Standard Deviation may indicate that the averaging parameter should be small in order to expand an averaging window whereas a low PCINR Standard Deviation may indicate that the averaging parameter should be large in order to apply recent PCINR (contract the averaging window). The averaging window may be used to determine whether to emphasize a prior PCINR from a prior time point, or to provide greater weight to a current PCINR from a current time point when generating a PCINR that is reported to the BS. A larger averaging window applies more of the current PCINR than the prior PCINR. Thus, selection of the averaging parameter by the BS directly impacts generation of the PCINR by the MS. The linear function may be applied to the PCINR Standard Deviation in order to determine which one of the potential averaging parameters expressed by the linear function is appropriate for the reported PCINR Standard Deviation.

According to various embodiments, the slope of the linear function, which may control the value of the averaging parameter resulting from application of the linear function, may be adjusted according to channel condition information reported by the MS. For example, the ACK/NACK ratio may be used to indicate a stability of the communication channel. A stable communication channel may indicate that the slope of the linear function should be increased, thereby resulting in lower averaging parameters as compared to an unstable communication channel.

According to various embodiments, the BS may use a prior averaging parameter from a prior time point, a prior PCINR Standard Deviation reported by the MS at the prior time point, and/or a slope of the linear function in order to adaptively control the averaging parameter. In this manner, prior channel condition information and current channel condition information may be used to adaptively control the averaging parameter.

Adaptive control of the averaging parameter may be achieved using these and other techniques, described in more detail below. Various other characteristics and features of the method and system of this disclosure will be apparent through the detailed description of various embodiments and the drawings attached hereto. It is also to be understood that both the foregoing general description and the following detailed description are examples and not restrictive of the scope of the inventive concept described herein.

DETAILED DESCRIPTION

According to various embodiments, a system and method of this disclosure may be used to adaptively control an averaging parameter generated by a base station (BS) and transmitted to a mobile station (MS) coupled to the BS via a communication channel in a communication network, such as a Wireless Metropolitan Area Network (WiMAX) described in the IEEE 802.16 specification. The BS may adapt the averaging parameter according to the channel condition of the communication channel. Thus, the averaging parameter may be adapted by the BS as the channel condition changes over subsequent communications. Because the MS uses the averaging parameter from the BS in order to generate channel condition for a subsequent communication on the communication channel, adaptive control of the averaging parameter may facilitate more accurate channel condition information generated by the MS as compared to use of a fixed averaging parameter. In turn, because the BS uses the channel condition information in order to perform adaptive download link adaptation, accurate channel condition information may improve subsequent communication, such as by facilitating appropriate MCS selection by the BS.

Figure 1:
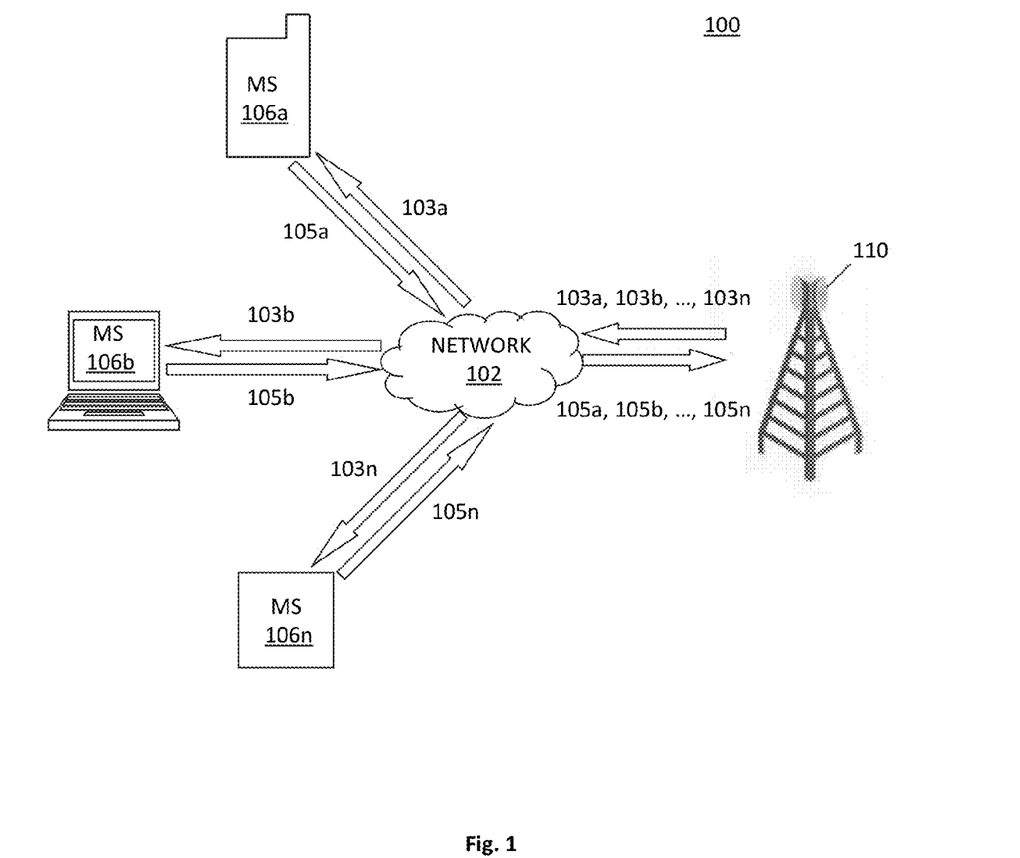
FIG. 1 is a block diagram illustrating an example system for adaptive control of an averaging parameter, according to an embodiment.

FIG. 1 is a block diagram illustrating an example of a system 100 for adaptive control of averaging parameter(s) 103a, 103b, . . . , 103n (hereinafter "averaging parameter 103" for convenience), according to an embodiment. System 100 may include, among other things, a BS 110 communicably coupled on respective communication channels (not shown) to MS 106a, MS 106b, . . . , MS 106n (hereinafter "MS 106" for convenience) via a network 102. BS 110 may adapt averaging parameter 103 according to the channel condition of a respective communication channel and may transmit averaging parameter 103 to a respective MS 106. In other words, BS 110 may transmit a respective averaging parameter 103 to each MS 106 according to the channel condition of respective communication channels.

According to various embodiments, averaging parameter 103 may be expressed as a ratio or any other parameter. In particular, the ratio may be expressed in increments of 1/16 such that BS 110 may adapt averaging parameter 103 by increments ranging from 1/16, 2/16, . . . , 16/16. Each MS 106 may use its respective averaging parameter 103 to generate corresponding channel condition information such as, among other things, PCINR and RSSI. When generating a current PCINR, for example, MS 106 may use averaging parameter 103 to generate an average of PCINR from a prior time point and PCINR from a current time point. It should be understood that "averaged" and "averaging" as used herein is not a "mathematical mean" (unless expressly indicated) but rather indicates that prior PCINR and recent PCINR are weighted according to averaging parameter 103. More particularly, averaging parameter 103 may be used to define an averaging window for averaging channel condition information of the prior time point and channel condition information of the current time point. The average PCINR, generated by averaging a prior PCINR and a current PCINR using averaging parameter 103, may be expressed by the following example:

$$\mu_{PCINR[k]} = \begin{cases} PCINR[0] & k = 0 \\ (1 - \alpha_{avg})\mu_{PCINR[k-1]} + \alpha_{avg}PCINR[k] & k > 0 \end{cases} \quad (1)$$

where:
$\mu_{PCINR[k]}$=current PCINR (averaged according to averaging parameter 103),
$\alpha_{avg}$=averaging parameter 103,
$\mu_{PCINR[k-1]}$=PCINR from a prior time point k−1, and
PCINR[k]=PCINR from a current time point k.

Equation (1) describes an example method by which MS 106 may generate channel condition information such as PCINR using averaging parameter 103. For a communication at an initial time point (k=0), PCINR at the initial time point (k=0) may be reported by MS 106 (since there are no prior PCINR data with which to average). At subsequent time points k>0, PCINR from a prior time point (k−1) is averaged with PCINR from a current time point (k). For example, according to equation (1), a larger averaging parameter 103 will result in weighting the PCINR from a prior time point (k−1) less than the PCINR from the current time point (k) as compared to a smaller averaging parameter 103. In other words, a larger averaging parameter 103 results in a smaller averaging window, as compared to a smaller averaging parameter 103. As such, recent PCINR (at time point (k)) will be more heavily weighted than prior PCINR (at time point (k−1)). In contrast, a smaller averaging parameter 103 will expand the averaging window as compared to a larger averaging parameter 103. In this case, the prior PCINR will be more heavily weighted than recent PCINR. Thus, different values of averaging parameter 103 will result in different sizes of averaging windows, thereby affecting whether prior or recent PCINR will be more heavily weighted when generating an average PCINR (reported to BS 110) for a current time point.

According to various embodiments, the channel condition information may be incorporated or otherwise included with Feedback 105*a*, Feedback 105*b*, . . . , Feedback 105*n* (hereinafter "Feedback 105" for convenience), which may be transmitted to BS 110.

According to various embodiments, Feedback 105 may include a Standard Deviation of the channel condition information described above. In other words, MS 106 may report a Standard Deviation of channel condition information. Standard Deviation of the channel condition information may indicate the combined effect of Doppler and fading. For example, a higher PCINR Standard Deviation over a number time points may indicate high Doppler and fast fading effects on the communication channel throughout the number of time points as compared to a lower PCINR Standard Deviation. Each time point may represent a transmission of a communication between BS 110 and MS 106 on a communication channel. A lower PCINR Standard Deviation may indicate low Doppler and low fading effects throughout the number of time points as compared to a higher PCINR Standard Deviation. Thus, the PCINR Standard Deviation, for example, may be used to indicate channel condition of the communication channel throughout the number of time points. The number of time points observed by the MS 106 in order to generate the Standard Deviation may be configurable. In other words, the number of time points used to generate the Standard Deviation may be varied by a vendor implementing the system or method. For example, a Standard Deviation window for measuring the PCINR Standard Deviation may vary according to particular needs. BS 110 may request MS 106 on an as-needed basis according to the Standard Deviation window.

According to various embodiments, Feedback 105 may include channel stability information, such as, for example, an ACK/NACK ratio. The ACK/NACK ratio indicates a ratio of successful transmissions and non-successful transmissions, thereby indicating channel stability.

According to various embodiments, BS 110 may perform various functions using the received Feedback 105.

For example, BS 110 may use the PCINR information from Feedback 105 to perform download link adaption for a subsequent communication with MS 106. In particular, BS 110 may select an appropriate Modulation Coding Scheme (MCS) according to the average PCINR reported by MS 106. Thus, channel condition information based on an adaptive averaging parameter 103 may enhance the ability of BS 110 to select a more appropriate coding scheme for communication to reflect changing channel conditions as compared to channel condition information based on a fixed averaging parameter.

According to various embodiments, BS 110 may use the PCINR Standard Deviation from Feedback 105 in order to adapt averaging parameter 103 for a subsequent communication on the communication channel, thereby enabling MS 106 to generate channel condition information according to current channel conditions. Thus, the system and method may be used to adaptively control averaging parameter 103 according to changing channel condition information.

According to various embodiments, BS 110 may use the channel stability information from Feedback 105 to adaptively control averaging parameter 103.

In operation, when a communication channel is initiated between BS 110 and MS 106, BS 110 may transmit an initial averaging parameter 103 to MS 106. The initial averaging parameter 103 may be predefined. For example, a vendor may set the initial averaging parameter 103 to a predefined value such as $4/16$. Using the initial averaging parameter 103, MS 106 may generate channel condition information corresponding to the initial communication at an initial time point. MS 106 may also generate a PCINR Standard Deviation of the channel condition information. In particular, MS 106 may generate the PCINR Standard Deviation, PCINR and/or information for the initial communication and include the generated information with Feedback 105. Alternatively or additionally, the initial PCINR (PCINR at time point k=0) may be configured to be set according to particular needs. Feedback 105 may be transmitted by MS 106 to BS 110, which may receive and use the Feedback 105. For example, BS 110 may use the PCINR from Feedback 105 in order to perform download link adaptation. Thus, PCINR information reflecting the current channel condition may facilitate enhanced communication by enabling selection by BS 110 of an appropriate coding scheme for subsequent communications. BS 110 facilitates obtaining current channel condition information by adaptive control of averaging parameter 103 using Feedback 105. For example, BS 110 may use the PCINR Standard Deviation to adapt averaging parameter 103. The adapted averaging parameter 103 may be transmitted to MS 106 during a subsequent communication. MS 106 may use the adapted averaging parameter 103 to generate subsequent channel condition information for the subsequent communication. This process may be iterated, thereby facilitating adaptive control of averaging parameter 103 as the channel condition changes over time.

BS 110 may form at least part of a communications network. In particular, BS 110 may be a base station that forms at least part of a WiMAX network. Although a single BS 110 is shown, it should be noted that more than one BS 110 may be used according to various embodiments.

Figure 2:
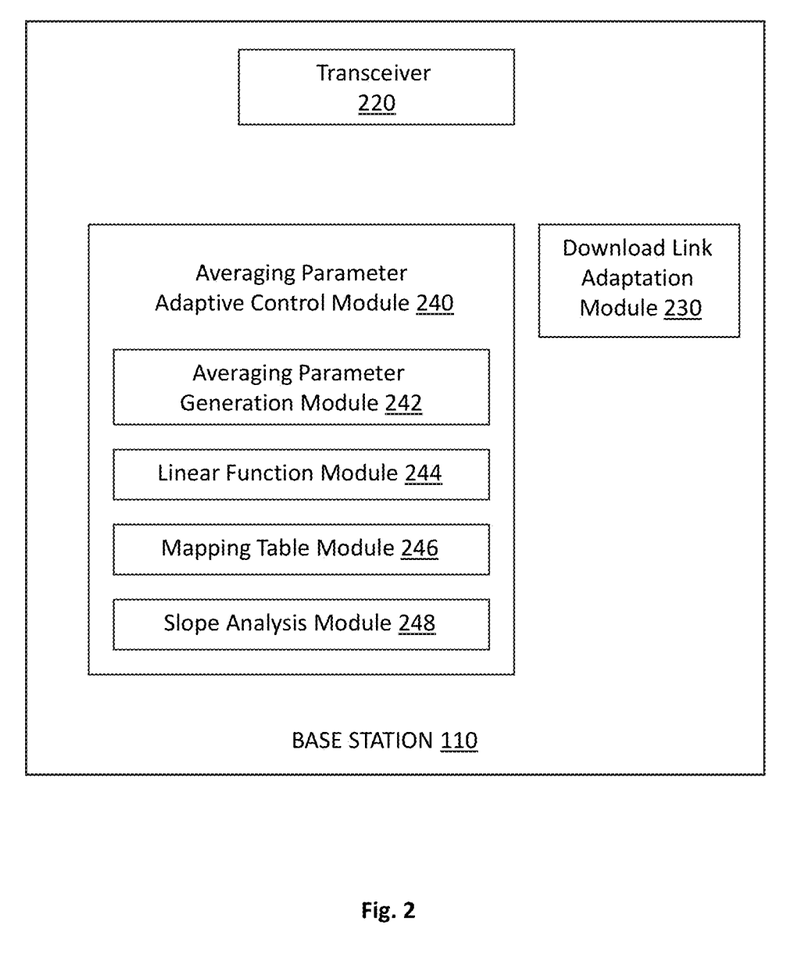
FIG. 2 is a block diagram illustrating an example base station, according to an embodiment.

FIG. 2 is a block diagram illustrating an example BS 110 communicably coupled to MS 106, according to an embodiment. BS 110 may include, among other things, a transceiver 220, a download link adaptation module 230, and an averaging parameter control module (APCM) 240. Transceiver 220 may transmit to and receive communications from MS 106 on one or more communication channels. For example, transceiver 220 may receive Feedback 105 from MS 106 and transmit to MS 106 various communications, including averaging parameter 103. Download link adaptation module 230 may receive Feedback 105 from transceiver 220 and perform download link adaptation. For example, download link adaptation module 230 may control the MCS based on the received PCINR from Feedback 105. In this manner, download link adaptation module 230 may control subsequent communication based on current channel conditions.

According to various embodiments, through various modules, APCM 240 may adaptively control averaging parameter 103. For example, APCM 240 may include, among other things, an averaging parameter generation module 242, a linear function module 244, a mapping table module 246, and a slope analysis module 248. By adaptively controlling averaging parameter 103, APCM 240 may facilitate more accurate channel condition information as compared to using a fixed averaging parameter 103.

According to various embodiments, averaging parameter generation module 242 may generate (or otherwise select) an initial averaging parameter 103 when a communication with MS 106 is initiated. As previously noted, MS 106 may use averaging parameter 103 to generate channel condition information and Standard Deviation that is included with Feedback 105. Averaging parameter generation module 242 may receive Feedback 105 from transceiver 220 and use Feedback 105 to adaptively generate a subsequent averaging parameter 103. Thus, averaging parameter generation module 242 may adaptively control averaging parameter 103 according to Feedback 105.

According to various embodiments, averaging parameter generation module 242 may adaptively control averaging parameter 103 in association with or otherwise using functions provided by linear function module 244. Linear function module 244 may generate a linear function for determining an appropriate averaging parameter 103 for the channel condition, indicated by information from Feedback 105. The linear function may represent potential averaging parameters 103 (from which averaging parameter generation module 242 selects) as a linear function of another variable such as, for example, information from Feedback 105. In particular, linear function module 244 may generate potential averaging parameters 103 as a linear function of potential Standard Deviations. This example function may be given by the following:

$$\alpha[k]=f(\sigma[k-1]) \qquad (2),$$

where:
k=time point for a subsequent communication,
k−1=time point for a prior communication,
α[k]=averaging parameter for the subsequent communication, and
σ[k−1]=reported Standard Deviation at the prior time point.

In this example, the linear function may result in lower averaging parameters 103 for higher Standard Deviations as compared to lower Standard Deviations. In other words, the linear function may linearly describe the following cases, which are examples merely to illustrate the general relationship expressed by the linear function:

Case 1: High PCINR Standard Deviation, Low averaging parameter 103;
Case 2: Low PCINR Standard Deviation, High averaging parameter 103.

In operation, the linear function may define a range of values of potential Standard Deviations from which an averaging parameter 103 is selected, thereby facilitating adaptive control of averaging parameter 103 according to a particular Standard Deviation reported in Feedback 105. For example, the Standard Deviation of channel condition reported by MS 106 in Feedback 105 may be applied by linear function module 244 to the linear function of potential averaging parameters 103 and potential Standard Deviations. In other words, the potential averaging parameter 103 corresponding to the reported Standard Deviation based on the linear function may be selected for transmission to MS 106. As previously noted, the PCINR Standard Deviation reported by MS 106 may indicate Doppler and fading effects. Thus, by applying the reported Standard Deviation to the linear function, averaging parameter 103 may be adaptively controlled according to the channel condition (reflected by the reported PCINR Standard Deviation).

According to various embodiments, the linear function generated by linear function module 244 may be adaptively changed according to Feedback 105. For example, slope analysis module 248 may adapt a slope of the linear function according to the ACK/NACK ratio of Feedback 105. Because the linear function may be used to adaptively control averaging parameter 103, adaptively changing the slope of the linear function using the ACK/NACK ratio, for example, may adapt averaging parameter 103 according to the ACK/NACK ratio. As previously noted, a time lag between a prior channel condition measurement and a current time point may exist, which may result in an inaccurate averaging parameter 103 due to stale channel condition information (a time lag problem). The time lag problem may result from window-based averaging and because reporting does not occur with each frame, each frame without reporting may not have information that is available in a frame with reporting. However, the ACK/NACK ratio is reported at each frame. As such, the ACK/NACK ratio may be used to mitigate the time lag problem by adjusting the slope of the linear function based on the indication of the stability of the communication channel, thereby adjusting the resultant averaging parameter 103 obtained using the linear function.

According to various embodiments, slope analysis module 248 may generate the ACK/NACK ratio, given by γ in the example equation below:

$$\gamma = \frac{ACK}{ACK + NACK} \qquad (3)$$

Slope analysis module 248 may use the ACK/NACK ratio to generate an adjustment delta. In particular, the adjustment delta may be, for example, a function of the ACK/NACK ratio. The particular effect of the ACK/NACK ratio on the adjustment delta may be configurable by the vendor. For example, the adjustment delta may be configured by the vendor to be a certain percentage of an averaging parameter at a prior time point, k−1. In a particular example, if the ACK/NACK ratio is greater than a particular percentage (e.g., greater than 50%), then the adjustment delta may be calculated as the product of ACK/NACK ratio and the averaging parameter at the prior time point. If the ACK/NACK ratio is less than the particular percentage then the adjustment delta may be calculated differently, such as by 1−ACK/NACK ratio.

Slope analysis module 248 may use the adjustment delta to adjust the slope of the linear function, thereby adapting the slope according to the channel condition (as indicated by the ACK/NACK ratio). As previously noted, the slope of the linear function may be used to adaptively control averaging parameter 103. Thus, adapting the slope according to the adjustment delta may facilitate adaptive control of the averaging parameter based on channel stability information indicated by the ACK/NACK ratio, for example.

According to various embodiments, the adjustment delta may be used to adjust the slope of the linear function upward (i.e., increase the slope), downward (i.e., decrease the slope), or have substantially no effect (i.e., the adjustment delta is substantially zero). For example, the following relationships between channel stability and adjusting the slope of the linear function, given by equations (4) and (5) below, describe stable and unstable channels.

$$\gamma\uparrow \Rightarrow \text{Stable} \Rightarrow \alpha\downarrow \Rightarrow a\uparrow \Rightarrow +\Delta \Rightarrow a[k]=a[k-1]+\Delta \qquad (4)$$

$$\gamma\downarrow \Rightarrow \text{Unstable} \Rightarrow \alpha\uparrow \Rightarrow a\downarrow \Rightarrow -\Delta \Rightarrow a[k]=a[k-1]-\Delta \qquad (5)$$

where (for both Equations (4) and (5)):
γ=ACK/NACK ratio
α=averaging parameter 103
a=slope
Δ=adjustment delta
a[k]=slope of linear function at time point k, and
a[k−1]=slope of linear function at time point k−1 (prior time point).

Equation (4) is an example of a relationship that describes a stable communication channel, as indicated by a sufficiently "high" ACK/NACK ratio. A determination of whether the ACK/NACK ratio is high may be predefined by the vendor. For example, the vendor may specify one or more stability thresholds by which an ACK/NACK ratio is deemed to be sufficiently stable. In particular, a non-limiting example of a stability threshold may be 90%-100%. Alternatively or additionally, a default stability threshold may be predefined. In this manner, the vendor may fine-tune the stability threshold according to particular needs. According to an embodiment, the adjustment delta may be configured by the vendor as any function of the ACK/NACK ratio. For example, the function may be a linear function or curvilinear function. In this example, a smaller averaging parameter 103 may be used when the communication channel is stable. Increasing the slope of the linear function may result in a smaller averaging parameter 103 for a given Standard Deviation, for example. Thus, in order to adaptively control the averaging parameter 103 to be smaller when the communication channel is stable, the slope of the linear function may be increased by adding the adjustment delta to the slope of the linear function of a prior communication at the prior time point. In other words, when the communication channel is stable, the slope of the linear function of the prior time point (k−1) may be increased for a subsequent communication at time point (k).

Equation (5) is an example of a relationship that describes an unstable communication channel, as indicated by a high ACK/NACK ratio. In this example, a larger averaging parameter 103 may be used when the communication channel is unstable. Decreasing the slope of the linear function may result in a larger averaging parameter 103 for a given Standard Deviation, for example. Thus, in order to adaptively control the averaging parameter 103 to be larger when the communication channel is stable, the slope of the linear function may be decreased by subtracting the adjustment delta from the slope of the linear function of a prior communication at the prior time point. In other words, when the communication channel is stable, the slope of the linear function of the prior time point (k−1) may be increased for a subsequent communication at time point (k).

According to various embodiments, once the current linear function is generated, APAC module 240 may use, among other things, a prior averaging parameter 103 for a prior time period (k−1), the reported Standard Deviation for the prior time period, and the current slope of the current linear function at a current time point (k) to adaptively control a current averaging parameter 103 for a subsequent communication. For example, the linear function may be expressed as:

$$Y = b - aX \Rightarrow a[k] = b - a \cdot \sigma[k-1] \Rightarrow a[k] = a[k-1] - a[k] \cdot \sigma[k-1] \quad (6), \text{where:}$$

Y=current averaging parameter a[k] at time point k,
b=prior averaging parameter a[k−1] at time point k−1,
a=current slope a[k] (slope at time point k), which may be further defined by a[k−1]±Δ, where Δ is the adjustment delta, and
X=reported Standard Deviation σ[k−1] (at time point k−1).

Thus, in the example described by equation (6), the averaging parameter 103 may be determined based upon the prior averaging parameter, the current slope of the current linear function, and the reported Standard Deviation from Feedback 105.

In operation, linear function module 244 in association with or otherwise using functions provided by slope analysis module 248, may adapt the slope of the linear function according to channel stability indicated by the ACK/NACK ratio, for example. By adapting the slope of the linear function, robust adaptive control of averaging parameter 103 may be achieved.

According to various embodiments, the linear function generated by linear function module 244 may be represented as a mapping table that maps the potential averaging parameters 103 to Standard Deviations. For example, averaging parameter generation module 242 may generate the mapping table in association with or otherwise using functions provided by mapping table module 246. Mapping table module 246 may represent the linear function by generating the mapping table (such as the example mapping table given by Table 1 below), which may be used to look up an appropriate averaging parameter 103 for a reported Standard Deviation, for example. It should be understood that the mapping table may map potential averaging parameters 103 to any other variable (in addition to or instead of Standard Deviation) for which linear function module 244 generates a linear function.

TABLE 1

| Standard Deviation | Averaging Parameter |
| --- | --- |
| sig 1 | 1/16 (0x0) |
| sig 2 | 2/16 (0x1) |
| sig 3 | 3/16 (0x2) |
| sig 4 | 4/16 (0x3) |
| sig 5 | 5/16 (0x4) |
| sig 6 | 6/16 (0x5) |
| sig 7 | 7/16 (0x6) |
| sig 8 | 8/16 (0x7) |
| sig 9 | 9/16 (0x8) |
| sig 10 | 10/16 (0x9) |
| sig 11 | 11/16 (0x10) |
| sig 12 | 12/16 (0x11) |
| sig 13 | 13/16 (0x12) |
| sig 14 | 14/16 (0x13) |
| sig 15 | 15/16 (0x14) |
| sig 16 | 16/16 (0x15) |

Referring to Table 1, sig 1, sig 2, . . . , sig 16 may represent particular Standard Deviation values, a range of Standard Deviation values, and/or combination of particular values and range of values. For example, sig 1 may be a particular Standard Deviation value such as 0.1 dB or a range of Standard Deviation values such as 0.1 dB to 10 dB. The preceding values are exemplary only, and should not be construed as limiting in any sense.

When using a particular Standard Deviation value, for example, the reported Standard Deviation may be rounded according to a rounding factor to match a closest sig N value. When using a range of Standard Deviation values or a particular Standard Deviation value +/− a match tolerance, for example, the reported Standard Deviation may be matched to the range or the match tolerance. Whichever method is used, the rounding factor, the range, and/or the match tolerance may be predefined. For example, the vendor may predefine these values, which may be stored in a Standard Deviation configuration profile or other database (not shown) for the vendor. In this manner, the mapping table may be flexibly accommodated to suit particular needs of the vendor by enabling configuration of the range of Standard Deviations of the mapping table while facilitating adaptive control of averaging parameter 103.

Figure 3A:
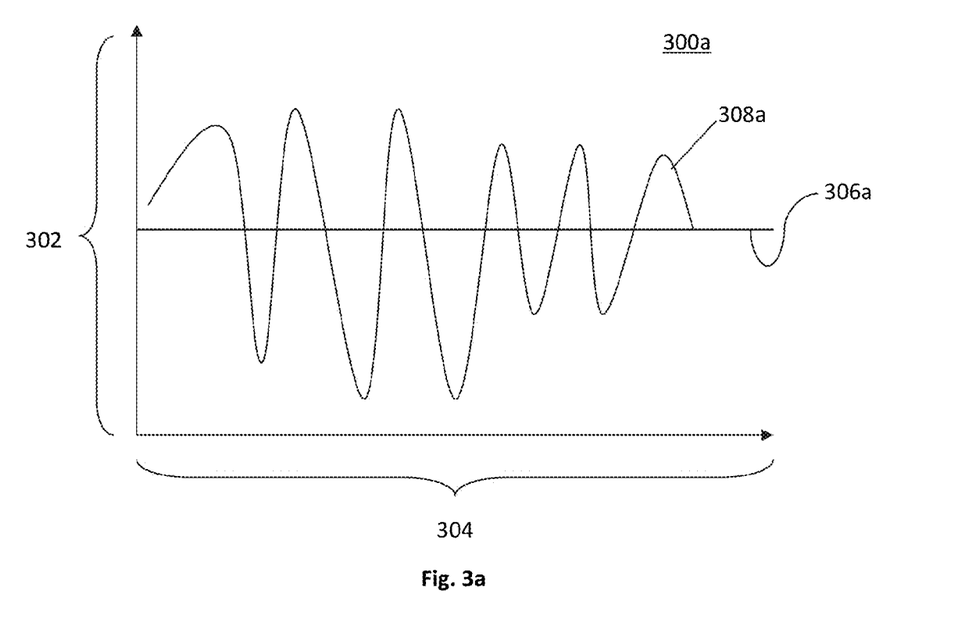
FIG. 3a is a two-dimensional graph illustrating an example of PCINR data over time with high Standard Deviation, according to an embodiment.

FIG. 3a is a two-dimensional graph illustrating an example of PCINR data 308a over time 304 exhibiting High Standard Deviation about a mathematical mean PCINR 306a, according to an embodiment. PCINR values 302 are shown as a function of time 304. It should be understood that in FIG. 3a and any other figures illustrating a two-dimensional graph herein, the graphs are illustrative only and should not be viewed as limiting. For example, the axes may be reversed as appropriate without departing from the scope of this disclosure. As previously noted, a higher Standard Deviation of PCINR, for example, over a number of time points may indicate high Doppler and fast fading effects of the communication channel as compared to a lower Standard Deviation. In order to address the high Standard Deviation, averaging parameter 103 may be smaller as compared to the case of low Standard Deviation in order to expand the averaging window, thereby relying more heavily on prior channel condition information as compared to a larger averaging parameter 103.

Figure 3B:
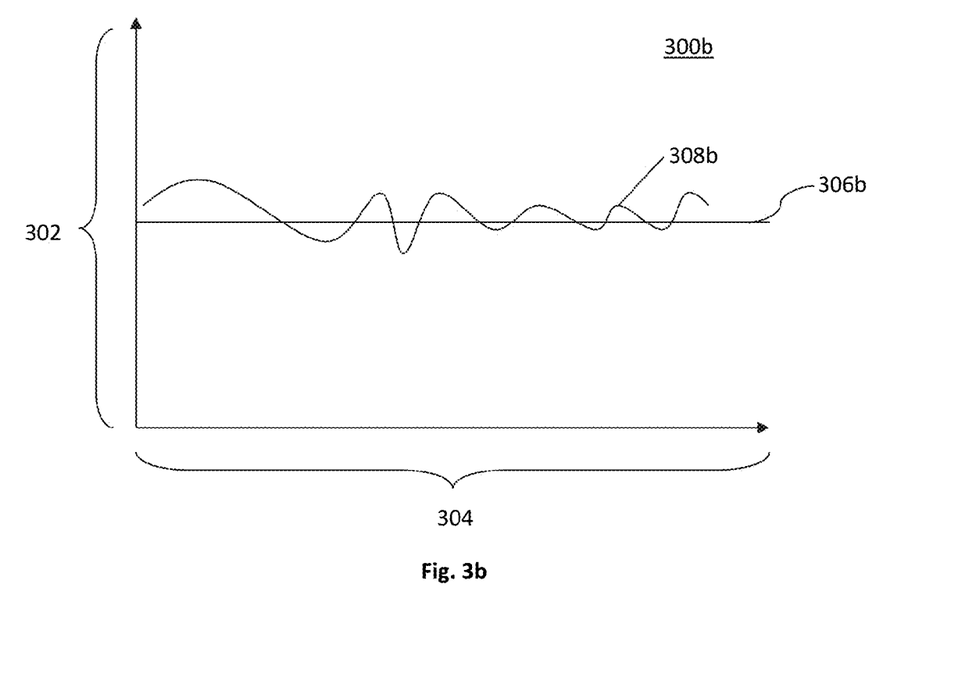
FIG. 3b is a two-dimensional graph illustrating an example of PCINR data over time with low Standard Deviation, according to an embodiment.

FIG. 3b is a two-dimensional graph illustrating an example of PCINR data 308b over time 304 exhibiting Low PCINR Standard Deviation about a mathematical mean PCINR 306b, according to an embodiment. PCINR values 302 are shown as a function of time 304. As previously noted, a lower PCINR Standard Deviation, for example, over a number time points may indicate low Doppler and slow fading effects of the communication channel as compared to a higher PCINR Standard Deviation. In order to address the low PCINR Standard Deviation, averaging parameter 103 may be larger as compared to high PCINR Standard Deviation in order to contract the averaging window, thereby relying more heavily on recent channel condition information as compared to a smaller averaging parameter 103.

Figure 4:
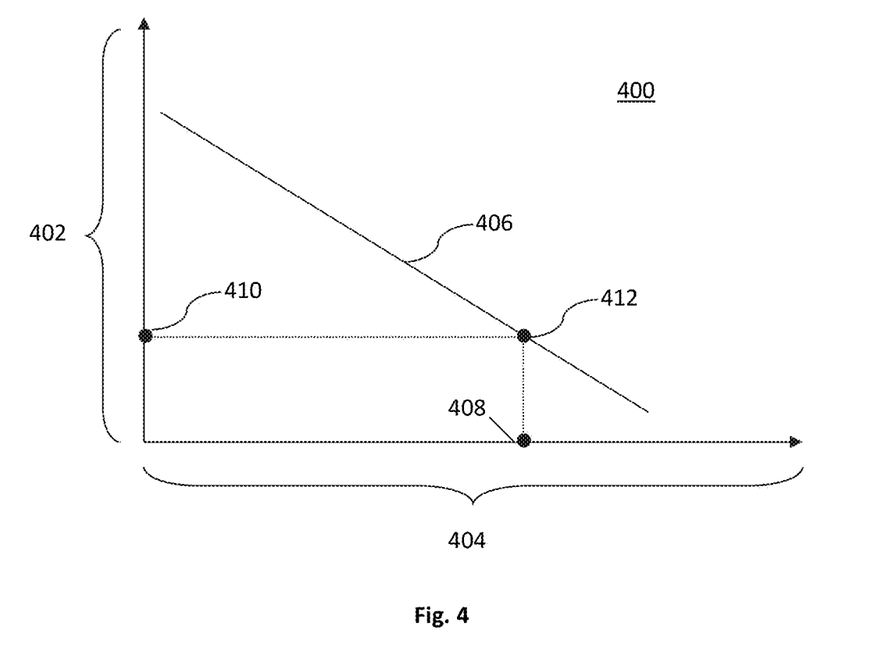
FIG. 4 is a two-dimensional graph illustrating an example of a linear function of averaging parameter as a function of Standard Deviation, according to an embodiment.

FIG. 4 is a two-dimensional graph 400 illustrating an example of a linear function 406 of potential averaging parameters 402 as a function of PCINR Standard Deviation 404, according to an embodiment. Point 408 represents a reported PCINR Standard Deviation by MS 106. Point 412 represents an application of linear function 406 to the reported PCINR Standard Deviation at point 408. Point 410 represents an averaging parameter 103 resulting from the application of linear function 406 to the reported PCINR Standard Deviation at point 408. Thus, based on the reported PCINR Standard Deviation at point 408 and application of linear function 406, an averaging parameter 103 at point 410 is determined by, for example, averaging parameter generation module 240. By using the reported PCINR Standard Deviation, which may indicate channel condition, to adaptively control averaging parameter 103, BS 110 may facilitate generation of PCINR that reflects current channel conditions.

Figure 5:
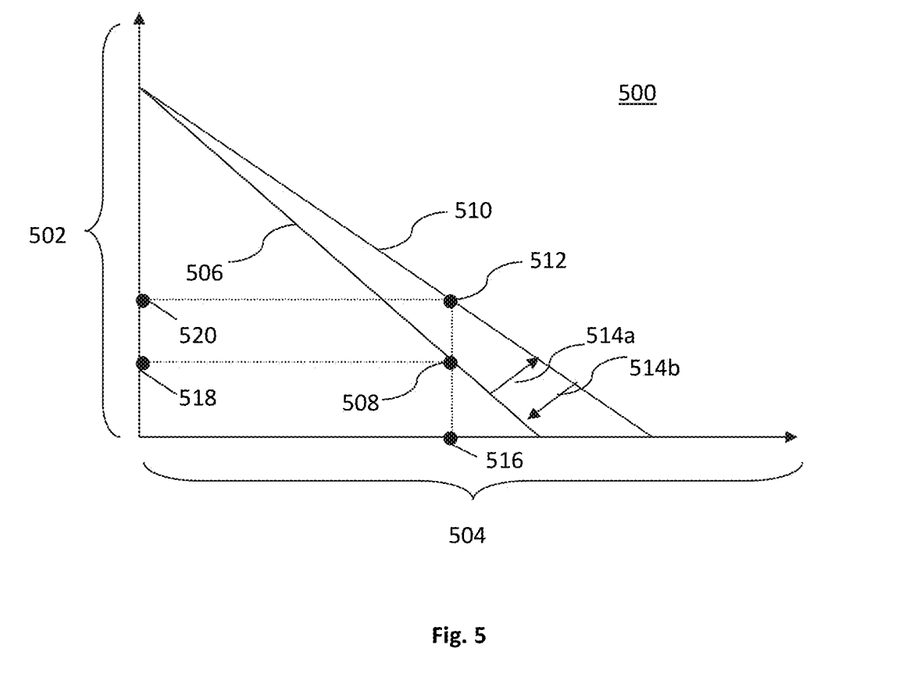
FIG. 5 is a two-dimensional graph illustrating an example of adaptively changing the slope of a first linear function or the slope of a second linear according to an adjustment delta, according to an embodiment.

FIG. 5 is a two-dimensional graph 500 illustrating an example of the effect of adaptively changing the slope of a first linear function 506 or the slope of a second linear function 510 according to an adjustment delta 514a or 514b, according to an embodiment. Potential averaging parameters 502 are shown as a function of Standard Deviations 504. First linear function 506 and second linear function 510 may each be used to map a Standard Deviation, represented by point 516 and reported by MS 106, to respective averaging parameters at points 518 and 520. Points 508 and 512 represent respective applications of first linear function 506 and second linear function 510 to the reported Standard Deviation corresponding to point 516.

For example, if the first linear function 506 represents a linear function at a prior time point (k−1), graph 500 illustrates the effect of decreasing the slope of the first linear function 506 by subtracting the adjustment delta 514a from the slope of the first linear function 506, thereby decreasing the slope of the first linear function 506. The result of the decreased slope is illustrated in this example by second linear function 510. By decreasing the slope of first linear function 506, graph 500 illustrates that the resulting averaging parameter increases from point 518 to point 520 for a reported PCINR Standard Deviation represented by point 516. Thus, by decreasing the slope of first linear function 506, a higher resulting averaging parameter at point 520 may be obtained for the reported PCINR Standard Deviation represented by point 516. Referring to equation (5), decreasing the slope (by subtracting adjustment delta 514a from the slope of a linear function from a prior time point) may be associated with an unstable channel. In other words, slope analysis module 248 may decrease the slope of first linear function 506 when the channel is determined to be unstable, as indicated from Feedback 105. As previously noted, a larger averaging parameter 103 results in a effect of smaller averaging window, thereby weighting recent PCINR more heavily than prior PCINR as compared to a smaller averaging parameter 103. Thus, the effects of the time lag may be mitigated.

Alternatively, if the second linear function 510 represents a linear function at a prior time point (k−1), graph 500 illustrates the effect of increasing the slope of the second linear function 510 by adding the adjustment delta 514b to the slope of the second linear function 510, thereby increasing the slope of the second linear function 510. The result of the increased slope is illustrated in this example by first linear function 506. By increasing the slope of second linear function 510, graph 500 illustrates that the resulting averaging parameter decreases from point 520 to point 518 for a reported PCINR Standard Deviation represented by point 516. Thus, by increasing the slope of second linear function 510, a lower resulting averaging parameter at point 518 may be obtained for the reported PCINR Standard Deviation represented by point 516. Referring to equation (4), increasing the slope (by adding adjustment delta 514b to the slope of a linear function from a prior time point) may be associated with a stable channel. In other words, slope analysis module 248 may increase the slope of second linear function 510 when the channel is determined to be stable, as indicated by Feedback 105. As previously noted, a smaller averaging parameter 103 results in a larger averaging window, thereby weighting prior PCINR more heavily than current PCINR as compared to a larger averaging parameter 103.

As illustrated in FIG. 5, a linear function from a prior time point (k−1) may be used to generated a linear function from a current time point (k). As such, APAC module 240 may receive or otherwise store historical linear function information from prior time points.

Figure 6:
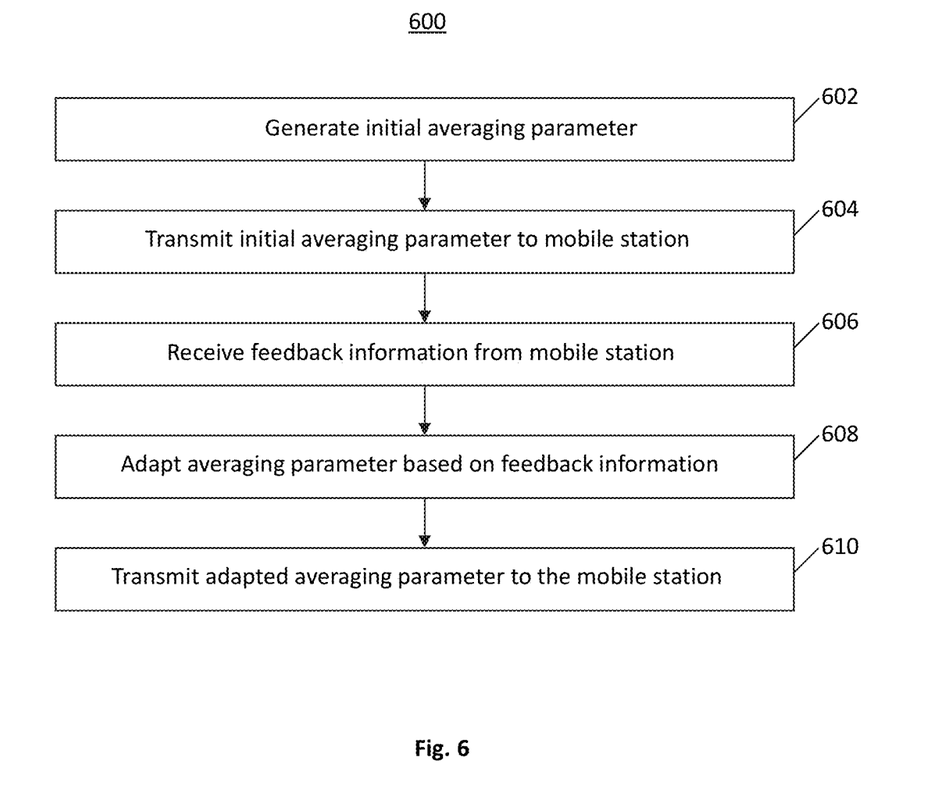
FIG. 6 is a flow diagram illustrating an example process for adaptive control of an averaging parameter, according to an embodiment.

FIG. 6 is a flow diagram illustrating an example process for adaptive control of an averaging parameter, according to an embodiment. The various processing operations depicted in the flow diagram of FIG. 6 (and in the other drawing figures) are described in greater detail herein. The described operations for a flow diagram may be accomplished using some or all of the system components described in detail above and, in some embodiments, various operations may be performed in different sequences. In other embodiments, additional operations may be performed along with some or all of the operations shown in the depicted flow diagrams. In yet other embodiments, one or more operations may be performed simultaneously. Accordingly, the operations as illustrated (and described in greater detail below) are examples by nature and, as such, should not be viewed as limiting.

According to various embodiments, an averaging parameter 103 may be generated (or otherwise selected) in an operation 602. Averaging parameter 103 may be expressed as a fractional ratio and more particularly, as a fractional ratio defined by increments of 1/16. Upon generation, in an operation 604, averaging parameter 103 may be transmitted to MS 106 on a communication channel. MS 106 may use averaging parameter 103 to generate first channel condition information of the communication channel, such as, for example, a first PCINR. MS 106 may generate the first PCINR by weighting a prior PCINR and a current PCINR using averaging parameter 103. In particular, the prior PCINR may be weighted by multiplying the prior PCINR by (1−averaging parameter 103) and by multiplying the current PCINR by averaging parameter 103. Thus, depending on the value of averaging parameter 103, the prior PCINR or the current PCINR will be more heavily weighted than the other. As such, averaging parameter 103 may be used to control whether prior PCINR or current PCINR will be weighted more heavily when generating the first PCINR. In an operation 606, Feedback 105 may be received from MS 106. Feedback 105 may include, for example, the first PCINR, a PCINR Standard Deviation indicating levels of Doppler effects and fading, and an ACK/NACK ratio indicating channel stability. In an operation 608, averaging parameter 103 may be adapted using Feedback 105. Thus, averaging parameter 103 may be adaptively controlled based on the channel condition.

Figure 7:
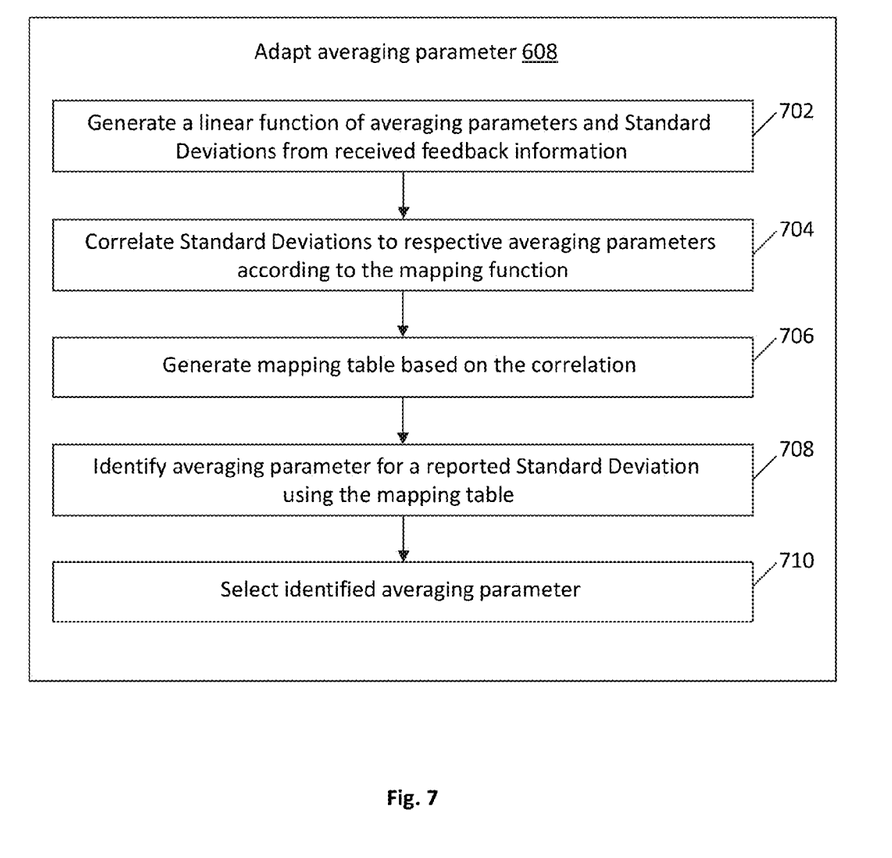
FIG. 7 is a flow diagram illustrating an example process for adapting an averaging parameter, according to an embodiment.

FIG. 7 is a flow diagram illustrating an example operation 608 for adapting an averaging parameter, according to an embodiment. In an operation 702, a linear function of potential averaging parameters 103 and potential Standard Deviations may be generated. In other words, potential averaging parameters 103 may be expressed as a linear function of Standard Deviations. In an operation 704, potential averaging parameters 103 may be correlated with Standard Deviations according to the linear function. In other words, each potential averaging parameter 103 may be correlated with a respective Standard Deviation described by the linear function. The Standard Deviation may be a particular value, a range of values, or a particular value with a match tolerance such that exact matches to the correlated Standard Deviations may be unnecessary. The particular value, the range of values, and/or the match tolerance may be configured by the vendor as appropriate. In an operation 708, a mapping table for the correlated potential averaging parameters 103 and Standard Deviations may be generated. In one embodiment, the mapping table may include 16 potential averaging parameters 103 (e.g., 1/16, 2/16, . . . , 16/16) mapped to 16 Standard Deviation values, 16 range of values, or 16 values with tolerances. In an operation 708, the reported Standard Deviation from Feedback 105 may be substantially matched to one of the Standard Deviation values, range of values or values with tolerances. An averaging parameter 103 corresponding to a substantially one of the Standard Deviation values, range of values or values with tolerances may be identified. In an operation 710, the identified averaging parameter 103 may be selected and subsequently transmitted to MS 106 during a subsequent communication. Thus, operation 508 may adaptively control averaging parameter 103 using current channel condition information.

Figure 8:
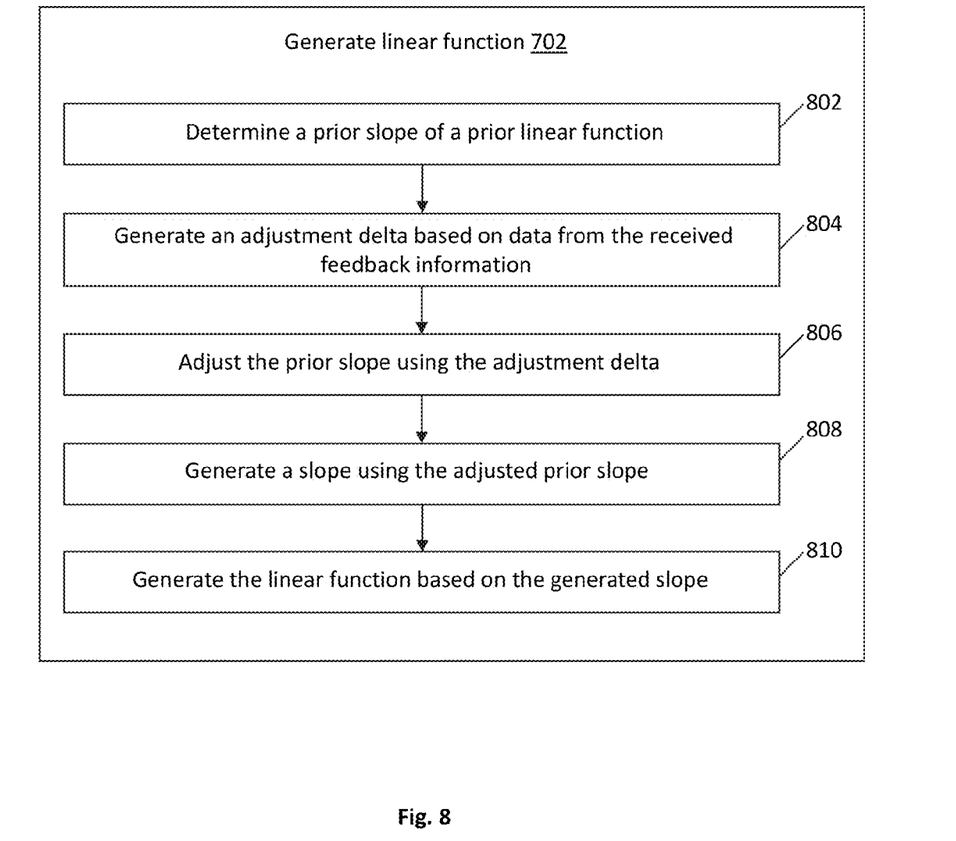
FIG. 8 is a flow diagram illustrating an example process for generating a linear function of averaging parameters as a function of Standard Deviation, according to an embodiment.

FIG. 8 is a flow diagram illustrating an example operation 602 for generating a linear function of averaging parameters as a function of Standard Deviation, according to an embodiment. In an operation 302, a prior slope of a prior linear function may be determined. In one embodiment, the prior slope and the prior averaging parameter 103 may be used to adaptively control the slope of a current linear function and therefore adaptively control a current averaging parameter 103. In an operation 804, an adjustment delta may be generated based on the ACK/NACK ratio from Feedback 105. The ACK/NACK ratio may indicate channel stability of the communication channel. As such, the adjustment delta may be generated as a function of the channel stability. In an operation 806, the prior slope may be adjusted using the adjustment delta. For example, when the communication channel is stable, the prior slope may be increased by adding the adjustment delta to the prior slope. In an operation 808, the increased slope may be used to generate a current slope for a current linear function. In an operation 810, the current linear function may be generated based on the current slope. The effect of increasing the prior slope is such that a lower averaging parameter 103 will result for a given Standard Deviation when applying the current linear function as compared to applying a prior linear function defined by the prior slope. Alternatively, when the communication is unstable, the prior slope may be decreased by subtracting the adjustment delta from the prior slope. The decreased slope may be used to generate a current slope for a current linear function, thereby defining the current linear function. The effect of decreasing the prior slope is such that a higher averaging parameter will result for a given Standard Deviation when applying the current linear function as compared to applying a prior linear function defined by the prior slope.

Examples of MS 106 may include any one or more of, for instance, a personal computer, portable computer, personal digital assistant (PDA), workstation, web-enabled mobile phone, WAP device, web-to-voice device, or other device. Those having skill in the art will appreciate that the inventive concept described herein may work with various system configurations.

In addition, various embodiments of this disclosure may be made in hardware, firmware, software, or any suitable combination thereof. Aspects of this disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable storage medium may include read only memory, random access memory, magnetic disk storage media, optical storage media, flash memory devices, and others. Further, firmware, software, routines, or instructions may be described herein in terms of specific exemplary embodiments that may perform certain actions. However, it will be apparent that such descriptions are merely for convenience and that such actions in fact result from computing devices, processors, controllers, or other devices executing the firmware, software, routines, or instructions.

Various embodiments herein are described as including a particular feature, structure, or characteristic, but every aspect or embodiment may not necessarily include the particular feature, structure, or characteristic. Further, when a particular feature, structure, or characteristic is described in connection with an embodiment, it will be understood that such feature, structure, or characteristic may be included in connection with other embodiments, whether or not explicitly described. Thus, various changes and modifications may be made to this disclosure without departing from the scope or spirit of the inventive concept described herein. As such, the specification and drawings should be regarded as examples only, and the scope of the inventive concept to be determined solely by the appended claims.

What is claimed is:

1. A system for adaptive control of an averaging parameter in a network having a plurality of mobile stations communicably coupled to a base station, the system comprising:
an averaging parameter adaptive control module associated with the base station, the averaging parameter adaptive control module comprising one or more processors configured to:
generate a first averaging parameter;
transmit the first averaging parameter to one of the plurality of mobile stations, wherein the first averaging parameter is used to generate first channel condition information that indicates a condition of the communication channel;
receive first feedback information comprising the first channel condition information from the one of the plurality of mobile stations;
generate a second averaging parameter using the first averaging parameter and the first feedback information; and
transmit the second averaging parameter from the base station to at least one mobile station.

2. The system of claim 1, wherein the one or more processors of the averaging parameter adaptive control module are configured to receive the first feedback information from the at least one mobile station.

3. The system of claim 2, wherein the one or more processors of the averaging parameter adaptive control module are further configured to:
receive second feedback information comprising second condition information from the at least one mobile station;
generate a third averaging parameter using the second averaging parameter and the second feedback information; and
transmit the third averaging parameter from the base station to the at least one mobile station.

4. The system of claim 1, wherein the first averaging parameter is a fractional ratio expressed as an integer multiple of 1/16th.

5. The system of claim 1, wherein the first channel condition information comprises Physical Carrier to Interference and Noise Ratio (PCINR) information and Received Signal Strength Indication (RSSI) information.

6. The system of claim 1, wherein the network is a WIMAX network.

7. A base station for adaptive control of an averaging parameter in a network having a plurality of mobile stations communicably coupled to the base station, the base station comprising:
an averaging parameter adaptive control module comprising one or more processors configured to:
generate a first averaging parameter;
transmit the first averaging parameter to one of the plurality of mobile stations, wherein the first averaging parameter is used to generate first channel condition information;
receive first feedback information comprising the first channel condition information from the one of the plurality of mobile stations;
adapt the first averaging parameter using the first feedback information and generate a second averaging parameter based on the adaptation; and
transmit the second averaging parameter from the base station to at least one mobile station.

8. The base station of claim 7, wherein the one or more processors are configured to receive the first feedback information from the at least one mobile station.

9. The base station of claim 7, wherein the first channel condition information comprises Physical Carrier to Interference and Noise Ratio (PCINR) information and Received Signal Strength Indication (RSSI) information.

10. The base station of claim 7, wherein the network is a WIMAX network.

11. An adaptive control device associated with a base station for adaptive control of an averaging parameter in a network having a plurality of mobile stations communicably coupled to base station, the adaptive control device comprising:
one or more processors configured to:
generate a first averaging parameter;
transmit the first averaging parameter to one of the plurality of mobile stations, wherein the first averaging parameter is used to generate first channel condition information;
receive first feedback information comprising the first channel condition information from the one of the plurality of mobile stations;
adapt the first averaging parameter using the first feedback information and generate a second averaging parameter based on the adaptation; and
transmit the second averaging parameter from the base station to at least one mobile station.

12. The adaptive control device of claim 11, wherein the one or more processors are configured to receive the first feedback information from the at least one mobile station.

13. The adaptive control device of claim 11, wherein the first channel condition information comprises Physical Carrier to Interference and Noise Ratio (PCINR) information and Received Signal Strength Indication (RSSI) information.

14. The adaptive control device of claim 11, wherein to generate the second averaging parameter, the one or more processors are configured to apply a first linear function of a first plurality of potential averaging parameters to the first feedback information.

15. The adaptive control device of claim 14, wherein the first linear function is adjusted based on a second linear function of a second plurality of potential averaging parameters.

16. The adaptive control device of claim 14, wherein the first feedback information further comprises a first standard deviation of the first channel condition information, and wherein the first linear function linearly associates the first plurality of potential averaging parameters with a plurality of standard deviations.

17. A computer-implemented method for adaptive control of an averaging parameter in a network having a plurality of mobile stations communicably coupled to a base station, the computer-implemented method comprising:
generating, by one or more processors of an averaging parameter control module associated with the base station, a first averaging parameter;
transmitting, by the one or more processors of the averaging parameter control module, the first averaging parameter to one of the plurality of mobile stations, wherein the first averaging parameter is used to generate first channel condition information;
receiving, by the one or more processors of the averaging parameter control module, first feedback information comprising the first channel condition information from the one of the plurality of mobile stations;

generating, by the one or more processors of the averaging parameter control module, a second averaging parameter using the first averaging parameter and the first feedback information; and transmitting, by the one or more processors of the averaging parameter control module, the second averaging parameter from the base station to at least one mobile station.

18. The computer-implemented method of claim 17, wherein said receiving comprises receiving the first feedback information from the at least one mobile station.

19. The computer-implemented method of claim 18, the method further comprising:

receiving, by the one or more processors of the averaging parameter control module, second feedback information comprising second condition information from the at least one mobile station;

generating, by the one or more processors of the averaging parameter control module, a third averaging parameter using the second averaging parameter and the second feedback information; and transmitting, by the one or more processors of the averaging parameter control module, the third averaging parameter from the base station to the at least one mobile station.

20. The computer-implemented method of claim 17, wherein the first averaging parameter is a fractional ratio expressed as an integer multiple of $\frac{1}{16}$th.

21. The computer-implemented method of claim 17, wherein the first channel condition information comprises Physical Carrier to Interference and Noise Ratio (PCINR) information and Received Signal Strength Indication (RSSI) information.

22. The computer-implemented method of claim 17, wherein said generating the second averaging parameter comprises applying a first linear function of a first plurality of potential averaging parameters to the first feedback information.

23. The computer-implemented method of claim 22, wherein the first linear function is adjusted based on a second linear function of a second plurality of potential averaging parameters.

24. The computer-implemented method of claim 23, wherein the first feedback information further comprises a first standard deviation of the first channel condition information, and wherein the first linear function linearly associates the first plurality of potential averaging parameters with a plurality of standard deviations.

25. A non-transitory computer readable medium storing computer executable instructions for adaptive control of an averaging parameter in a network having a plurality of mobile stations communicably coupled to a base station, the instruction when executed configuring one or more processors to perform a plurality of operations comprising:

generating a first averaging parameter;

transmitting the first averaging parameter to one of the plurality of mobile stations, wherein the first averaging parameter is used to generate first channel condition information;

receiving first feedback information comprising the first channel condition information from the one of the plurality of mobile stations;

generating a second averaging parameter using the first averaging parameter and the first feedback information; and transmitting the second averaging parameter from the base station to at least one mobile station.

26. The non-transitory computer readable medium of claim 25, wherein said receiving comprises receiving the first feedback information from the at least one mobile station.

* * * * *